United States Patent [19]

Ebdon et al.

[11] 4,196,525
[45] Apr. 8, 1980

[54] STORAGE OF GAS

[75] Inventors: Paul R. Ebdon, Reading; Arthur G. Knapton, Rickmansworth, both of England

[73] Assignee: Johnson, Matthey & Co., Limited, London, England

[21] Appl. No.: 820,748

[22] Filed: Aug. 1, 1977

[30] Foreign Application Priority Data

Aug. 13, 1976 [GB] United Kingdom ............... 33780/76

[51] Int. Cl.² ............................................. F17C 11/00
[52] U.S. Cl. ......................................... 34/15; 55/387; 423/248; 62/48
[58] Field of Search ................... 62/48; 34/15; 123/14, 123/DIG. 12; 55/387; 423/248

[56] References Cited

U.S. PATENT DOCUMENTS

| 3,508,414 | 4/1970 | Wiswall, Jr. et al. | 62/48 |
| 3,516,263 | 6/1970 | Wiswall, Jr. et al. | 62/48 |
| 3,678,662 | 7/1972 | Grote | 55/387 |
| 3,732,690 | 5/1973 | Meijer | 123/1 A |
| 3,755,994 | 9/1973 | Bidiwala | 55/387 |
| 3,922,872 | 12/1975 | Reilly et al. | 62/48 |
| 3,950,960 | 4/1976 | Kawam | 62/48 |

Primary Examiner—Ronald C. Capossela
Attorney, Agent, or Firm—Cushman, Darby & Cushman

[57] ABSTRACT

Apparatus for the storage of hydrogen comprising a fibrous encapsulating material and solid particles of an intermetallic compound capable of reversibly absorbing hydrogen encapsulated in the material, the material being porous to the ingress and egress of hydrogen, but being impervious to the solid particles of the intermetallic compound, and a cylindrical gas tight heat exchange chamber, including an inlet and outlet, enclosing the encapsulated intermetallic compound, the porous, fibrous material being of generally strip form and being spirally wound to form a generally cylindrical body which is housed within the gas tight chamber.

11 Claims, 9 Drawing Figures

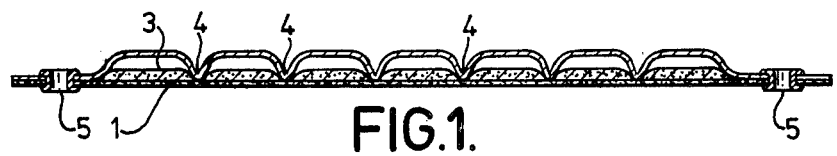
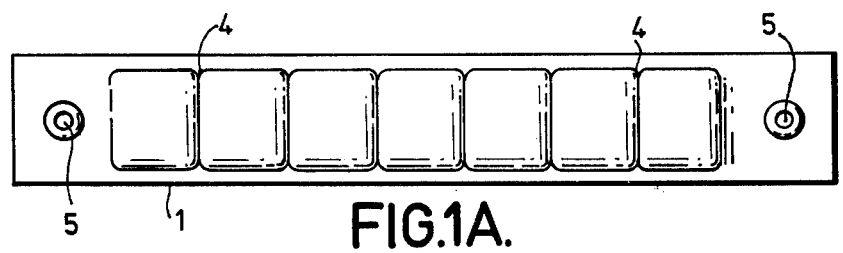
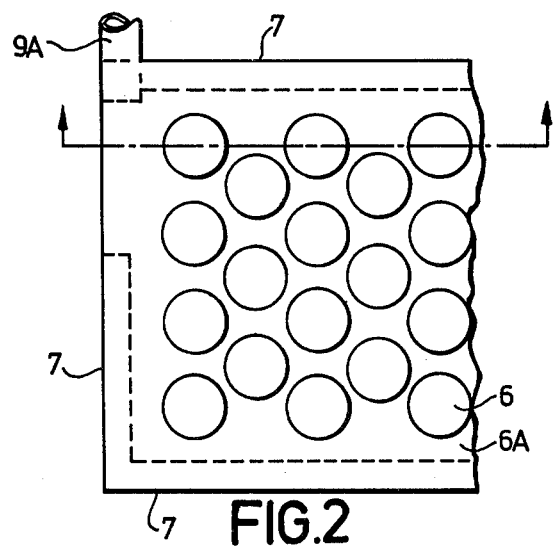
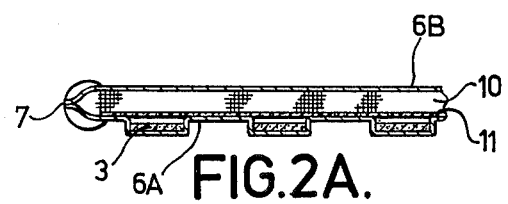

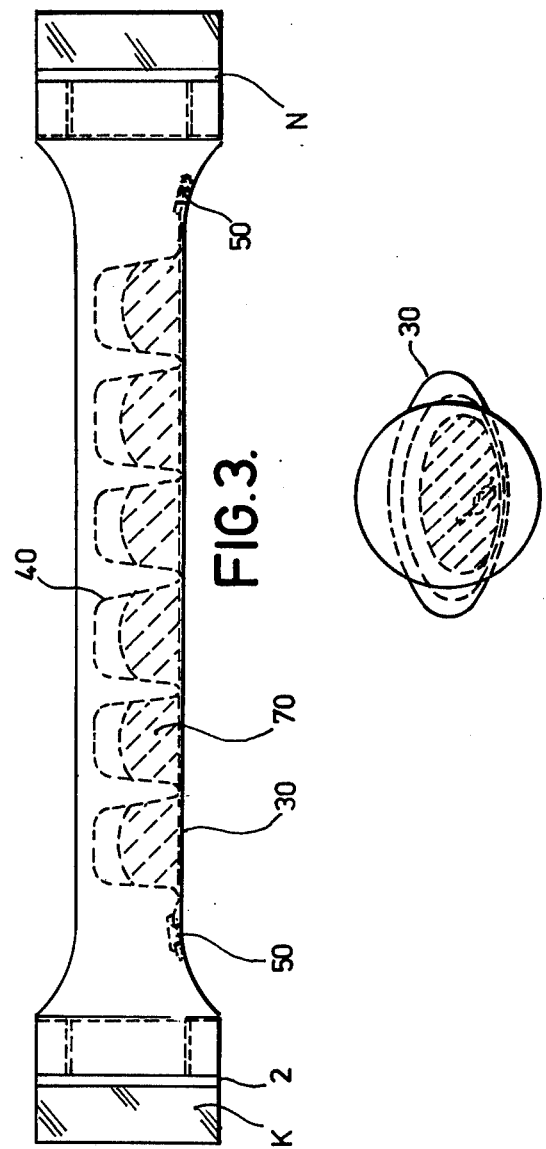

STORAGE OF GAS

This invention relates to the storage of hydrogen.

Hydrogen as a source of energy is assuming increasing importance and it is now a frequent necessity that hydrogen be stored in a form that is readily accessible. The conventional method of storage of hydrogen on a small scale involves the use of thick walled pressurised cylinders which are weighty and bulky and, in certain circumstances, constitutes an explosion hazard. On a larger scale it is often convenient to store the hydrogen in a liquid state, but this may only be achieved by the use of cryogenic techniques involving expensive liquefaction equipment. Further the energy required in the refrigeration process represents a large proportion of the energy available from combustion of the hydrogen and this method of storage is, therefore, uneconomic.

It is known that certain metals will absorb hydrogen to a greater or lesser extent. For example, titanium forms $TiH_2$, however, the hydrides are not readily prepared and they are too stable when formed to be suitable for application as hydrogen storage media.

Certain intermetallic compounds, however, have pressure-composition-temperature relationships with hydrogen which make them suitable for the absorption and desorption of hydrogen and thus for its storage. A limitation to the use of such compounds, however, is that they are extremely brittle. During absorption of hydrogen there is considerable expansion of the intermetallic lattice structure followed by a corresponding contraction when the hydrogen is desorbed. The stresses associated with these volume changes causes a progressive break-up or comminution of the compound and the ultimate result is the formation of an ultrafine powder. In the case of $LaNi_5$, the limiting particle size below which no further breakdown occurs has been shown to be of the order of 4 microns. This phenomenon results in practical difficulties in the operation of intermetallic stores for hydrogen. Thus, due allowance must be made for expansion when designing a store and since the fine powder has a tendency to pack into relatively impermeable beds, access for the gas is thereby restricted. A further drawback arises when gas is being removed from the store because there is a likliehood that fine particles of intermetallic compound will be carried from the store into the gas stream and, therefore, lost.

It is an object of the present invention to devise an apparatus for the storage of hydrogen which overcomes the above-mentioned drawbacks to the use of intermetallic compounds. According to one aspect of the present invention an apparatus for the storage of hydrogen comprises an intermetallic compound capable of reversibly absorbing hydrogen encapsulated in a material which is porous to the ingress and egress of hydrogen, but is impervious to solid particles of the said intermetallic compound.

Preferably the material used for encapsulation is both fibrous and porous, Examples of such materials are finely woven cloth comprising fibres of natural, synthetic or mineral origin e.g. cotton, nylon or asbestos. Other examples of porous fibrous materials which may be used are paper, felted metal or woven glass fibre.

According to a second aspect of the present invention an apparatus for storing hydrogen comprises a gas tight heat exchange chamber containing an encapsulated intermetallic compound, the said intermetallic compound being capable of reversibly adsorbing hydrogen and in which the medium encapsulating the said intermetallic compound is porous to the ingress and engress of hydrogen but is impervious to solid particles of said intermetallic compound.

According to a third aspect of the present invention a process for the storage of hydrogen comprises admitting hydrogen under pressure to an apparatus according to the present invention and at the same time providing the heat exchange chamber with a cooling fluid medium to remove the heat released.

According to a fourth aspect of the present invention a process for the release of hydrogen from a store according to the present invention comprises reducing the pressure in the store and at the same time supplying heat to the store in the form of a high temperature fluid by means of the heat exchange chamber.

Examples of intermetallic compounds suitable for use with the present invention are $LaNi_5$ or TiFe operating near ambient temperature and 2-3 atmospheres pressure, or $Mg_2Ni$ which is suitable for operation at 250° C.

The invention will now be described by way of example with reference to the accompanying drawings in which:

FIGS. 1 and 1A show one form of the invention in sectional side elevation and plan respectively;

FIGS. 2 and 2A show in plan and sectional elevation respectively, a strip of material used in a modified form of the invention;

FIGS. 3 and 3A show a further form of the invention in side and end elevation respectively.

Figure 2B:
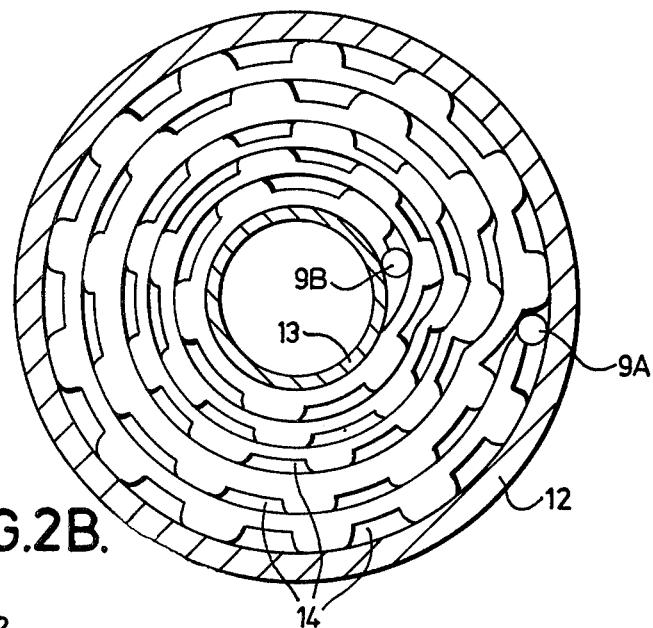
FIG. 2B shows the strip of FIGS. 2/2A spirally wound around a central tube and contained within an outer tube.

FIG. 1 shows one form of encapsulating an intermetallic hydrogen storage compound in particulate form in a finely woven porous sheet material 1. A number of inline pouches are formed in the sheet material 1 by stitching or otherwise joining along the seams 4 and each pouch contains a measured quantity of the intermetallic storage compound 3. Eyelet holes 5 serve to affix the pouch-strip in a storage or other vessel not shown. The storage or other vessel may take the form of a flattened tube, of a heat conducting material such as copper or aluminium, and a multiplicity of these tubes would be manifolded together to produce the complete store. If it should prove necessary extra heat transfer surfaces for example by way of fins may be affixed to the tubular store in a manner known in heat exchange technology. The porous pouched strip of FIGS. 1 and 1A constrains each quantity 3 of storage material within its individual pouch. Thus, the intermetallic hydrogen storage compound 3 does not settle to the bottom of the storage vessel as an impermeable bed, but remains in the relatively small pouches 2 so that free access of gas is allowed indefinitely. In such an arrangement the intermetallic compound 3 may be loaded in the form of coarse granules or sintered pellets for each of handling but progressive comminution to micron-sized powder would not lead to any inconvenience in operation. Expansion of the compound during hydriding is accommodated by making the pouches loose, rather than tight fitting. Subsequent volume changes during the charge/-discharge cycles will then be readily accommodated.

Although the porous store is shown as a linear array of pouches, it is not intended that this precludes other arrangements, such as quilted stores in two dimensions or even individual envelopes of porous material.

In an alternative construction one layer of the store is made of a heat conducting layer, such as aluminium or copper foil, and a second layer is made from the porous membrane which is arranged to form the pouches.

Another embodiment of the invention is illustrated in FIGS. 2 and 2A. In this embodiment pouches for the intermetallic compound 3 are formed as a multiplicity of indentations 6 in a sheet of metal foil 6A. In the FIGS. 2 and 2A these indentations 6 are circular but could equally well be square, rectangular, trough shaped and so forth. A porous retaining layer 11 which corresponds to sheet 1 in FIGS. 1 and 1A is pressed over these indentations and held in position by a wire gauze layer 10 and a further plane sheet of metal foil 6B as shown in the detail. The main function of the gauze is to allow free lateral passage of the hydrogen gas between the two enveloping foil layers 6A and 6B. The two layers of metal foil 6A and 6B are bonded along their edges 7 to form a long envelope which is fitted with suitable tubes 9A/9B for passage of the hydrogen gas to and from the envelope. As produced such an envelope is relatively weak mechanically and does not withstand the hydrogen pressure without ballooning. However, by winding the strip around a stout tube or core 13 into a tight spiral, constrained on the outside by a further stout tube 12 a rigid strong store is produced. Air passages 14 between the array of indentations are present in the spiralled structure to allow heat transfer by convection if the store is used with the axis vertical, or air may be blown with a fan through these passages if it is required to use the store in any other configuration.

FIG. 3 illustrates a further form of the invention, and shows a single tube only. In practice a considerable number of such tubes would be employed to produce the desired storage capacity. To increase the surface area to volume ratio and hence improve heat transfer, a tube 30 illustrated has been flattened into an alliptical cross section, but this is not an essential requirement of the unit. Loading of the tube array or strip of pouches as shown in FIGS. 1 and 1A is accomplished via the knurled end closure K and sealing gasket 2. As in the previous examples the intermetallic compound 70 is contained in a porous envelope 40 with supporting eyelet 50.

Figures 4, 4A:
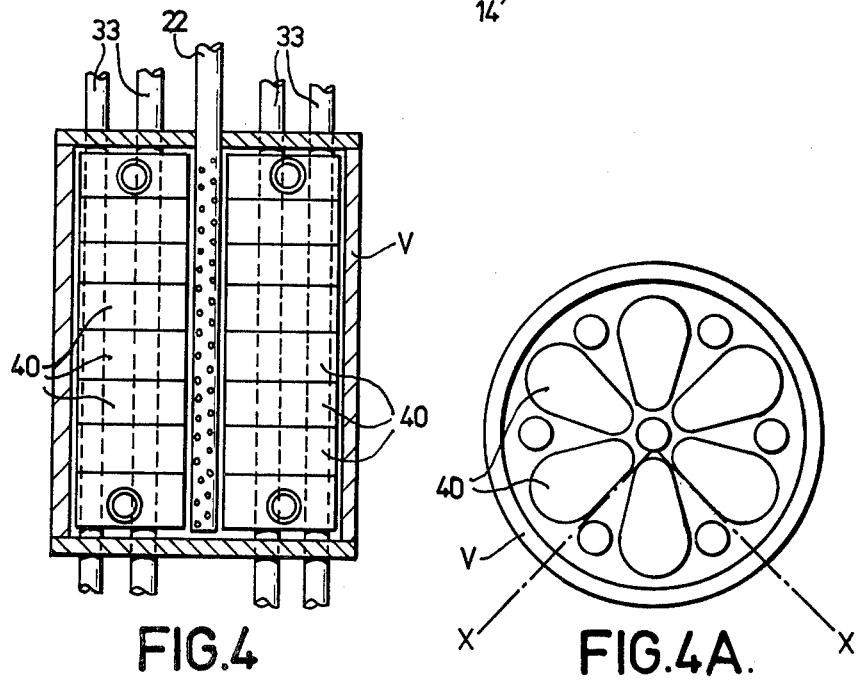
FIGS. 4 and 4A show in sectional elevation and plan respectively yet a further form of the invention.

Alternatively, cooling and heating channels may be made in tubular or similar form as shown in FIG. 4. This illustrates schematically a close packed array of porous intermetallic compound containers 40 (see FIG. 3) housed in a stout outer vessel V.

In the form of invention shown in FIGS. 4 and 4A the thermal requirements of the store are catered for by heating or cooling the tubes 33 by circulating gas or water, or by using heat pipes or other methods of heat transfer. Hydrogen is admitted or released from this store via the centrally disposed perforated tube 22.

What we claim is:

1. Apparatus for the storage of hydrogen comprising a fibrous encapsulating material and solid particles of an intermetallic compound capable of reversibly absorbing hydrogen encapsulated in said material, said material being porous to the ingress and egress of hydrogen, but being impervious to the solid particles of the said intermetallic compound, and a cylindrical gas tight chamber, including an inlet and outlet, enclosing said encapsulated intermetallic compound, the porous, fibrous material being of generally strip form and being spirally wound to form a generally cylindrical body which is housed within the gas tight chamber.

2. Apparatus according to claim 1 wherein the said material comprises fibres of natural, synthetic or mineral origin.

3. Apparatus according to claim 2 wherein the material is selected from nylon, cotton and asbestos.

4. Apparatus according to claim 1 wherein the cylindrical body includes a plurality of passages between adjacent convolutions of the spirally wound strips.

5. Apparatus according to claim 1 wherein the said porous material is of generally strip form and wherein a plurality of such strips are superimposed to form a body which is housed within the gas tight chamber.

6. Apparatus according to claim 5 wherein the body includes a plurality of passages between adjacent superimposed sheets or strips.

7. Apparatus according to claim 1 wherein the intermetallic compound is selected from the group consisting of $LaNi_5$, $Ti Fe$ and $Mg_2Ni$.

8. A process for the storage of hydrogen comprising admitting hydrogen under pressure to the chamber of an apparatus according to claim 1 and at the same time providing the heat exchange chamber with a cooling fluid medium to remove the heat released.

9. A process according to claim 8 wherein the intermetallic compound is $LaNi_5$ or $Ti Fe$ and wherein the process is carried out at substantially ambient temperature and at a pressure of 2-3 atmospheres.

10. A process according to claim 8 wherein the intermetallic compound is $Mg_2 Ni$ and the process is carried out at a temperature of 250° C.

11. A process for the release of hydrogen from an apparatus as claimed in claim 1 comprising reducing the pressure in the chamber and at the same time supplying heat to the chamber interior in the form of a high temperature fluid by means of the heat exchange chamber.

* * * * *